(12) United States Patent
Bae et al.

(10) Patent No.: US 9,058,072 B2
(45) Date of Patent: Jun. 16, 2015

(54) TOUCH SENSING APPARATUS AND DRIVING METHOD THEREOF

(71) Applicant: LG DISPLAY CO., LTD., Seoul (KR)

(72) Inventors: Sanghyuck Bae, Paju-si (KR); Sungchul Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 163 days.

(21) Appl. No.: 13/687,738

(22) Filed: Nov. 28, 2012

(65) Prior Publication Data

US 2013/0342478 A1     Dec. 26, 2013

(30) Foreign Application Priority Data

Jun. 21, 2012   (KR) .................. 10-2012-0066963

(51) Int. Cl.
G06F 3/041   (2006.01)
G06F 3/044   (2006.01)
G09G 3/36    (2006.01)

(52) U.S. Cl.
CPC .............. *G06F 3/041* (2013.01); *G06F 3/0412* (2013.01); *G06F 3/0416* (2013.01); *G06F 3/044* (2013.01); *G09G 3/36* (2013.01); *G09G 2320/0223* (2013.01)

(58) Field of Classification Search
CPC ...... G06F 3/044; G06F 3/0412; G06F 3/0418
USPC .......... 345/104, 173–174; 178/18.06
See application file for complete search history.

(56) References Cited

U.S. PATENT DOCUMENTS

| | | | |
|---|---|---|---|
| 6,750,837 B1* | 6/2004 | Kondoh | 345/97 |
| 2005/0162410 A1* | 7/2005 | Johnson et al. | 345/174 |
| 2006/0238525 A1* | 10/2006 | Hong et al. | 345/204 |
| 2008/0198140 A1* | 8/2008 | Kinoshita et al. | 345/173 |
| 2009/0085903 A1* | 4/2009 | Yamashita et al. | 345/211 |
| 2009/0273556 A1* | 11/2009 | Shimoshikiryoh et al. | 345/99 |
| 2011/0267295 A1* | 11/2011 | Noguchi et al. | 345/173 |
| 2011/0316809 A1* | 12/2011 | Kim et al. | 345/174 |
| 2012/0075240 A1* | 3/2012 | Kida et al. | 345/174 |

* cited by examiner

*Primary Examiner* — Hong Zhou

(74) *Attorney, Agent, or Firm* — Birch, Stewart, Kolasch & Birch, LLP

(57) ABSTRACT

A touch sensing apparatus according to an embodiment of the present invention includes: a display device including a plurality of pixels and displaying an image; a touch screen including a plurality of touch sensors and being included in the display device; display panel driving circuits for driving the display device; a touch sensing circuit for applying a driving signal to the touch sensors to sense a voltage or capacitance variation in the touch sensors; a controller for time-dividing a first frame period into a first driving period for displaying an image on the display device and a second driving period for sensing the touch sensors; and a reset control circuit for controlling operations of the display panel driving circuits with a reset enable signal to initialize the pixels of the display device to an equivalent reset voltage at predetermined intervals between the first driving period and the second driving period.

16 Claims, 19 Drawing Sheets

| 0 | 0 | 0 | 2 | 0 | 0 | 0  | 2 |
|---|---|---|---|---|---|----|---|
| 0 | 0 | 0 | 0 | 0 | 0 | 12 | 0 |
| 0 | 1 | 0 | 0 | 0 | 0 | 0  | 3 |
| 0 | 0 | 0 | 0 | 0 | 0 | 0  | 9 |
| 0 | 0 | 0 | 2 | 0 | 7 | 0  | 2 |
| 0 | 0 | 8 | 0 | 0 | 0 | 0  | 0 |
| 0 | 0 | 0 | 0 | 0 | 0 | 0  | 0 |
| 0 | 0 | 0 | 0 | 0 | 0 | 0  | 0 |

TOUCH SENSING APPARATUS AND DRIVING METHOD THEREOF

This application claims the priority benefit of Korea Patent Application No. 10-2012-0066963 filed on Jun. 21, 2012, which is incorporated herein by reference for all purposes as if fully set forth herein.

BACKGROUND

1. Field

This document relates to a touch sensing apparatus and a driving method thereof.

2. Related Art

A user Interface (UI) enables communication between a person (user) and various electric and electronic devices to allow the user to easily control the devices. Examples of the UI include a keypad, a keyboard, a mouse, an on screen display (OSD), a remote controller having an infrared communication or radio frequency (RF) communication function, etc. User interface technology is developed to improve user's emotion and operation convenience. Recently, UI has been evolved to a touch UI, a voice recognition UI, a 3D UI, etc. The touch UI is basically installed in a mobile information device. To implement the touch UI, a touch screen is provided to a display device of home appliances or mobile information device.

Touch sensors that construct a touch screen can be implemented as capacitive touch sensors, resistive touch sensors, etc. A capacitive touch screen is applied to a wide range of applications because it has durability and definition higher than those of a resistive touch screen and can recognize multi-touch and proximity touch recognition.

A touch sensing apparatus including a display device and a touch screen determines whether contact (or proximity) of a conductive material is made and the contact point of the conductive material by sensing a touch sensor capacitance variation before and after touch (or proximity touch). The touch screen is generally located in or on a display panel of the display device, and thus noise is applied to voltages of touch sensors due to the influence of a driving signal of the display panel. This is because signal lines connected to the touch sensors and signal lines connected to pixels of the display panel electrically affect each other due to coupling thereof.

The noise is largely affected by a time variation in a data voltage applied to liquid crystal cells. The display panel includes a plurality of pixels as shown in FIG. 1. Each of the pixels has pixel capacitance including liquid crystal capacitance Clc and storage capacitance Cst. When the display panel is touched by a user's finger, the pixel capacitance can further include finger capacitance Cf. As the data voltage varies with time, a charging voltage of the pixel capacitance is changed to causes noise in the voltages of the touch sensors. In addition, the data voltage variation affects a first parasitic capacitance Cgd between a gate line and a data line, a second parasitic capacitance Cgp between the gate line and a pixel electrode, a third parasitic capacitance Cdp between the data line and the pixel electrode, and a fourth parasitic capacitance Cgc between the gate line and a common electrode, thereby bringing about noise in the voltages of the touch sensors.

Noise inflow due to the data voltage variation becomes a problem when one frame is time-divided into a display panel driving period T1 and a touch screen driving period T2, particularly, as shown in FIG. 2. When a difference between a data voltage for black gradation and a data voltage for white gradation is large, a variation in the charge quantity of a pixel (pixel capacitance and parasitic capacitance) increases when black gradation and white gradation are changed each other. Provided that the data voltage corresponding to white gradation is 5V and the data voltage corresponding to black gradation is 0V, the pixel charge quantity is varied by 5V (0V to 5V) in case of black-to-white gradation change. Considering inversion, the pixel charge quantity is varied by 10V (−5V to 5V) in the event of white-to-white gradation change. This pixel charge quantity variation is applied to the voltages of the touch sensors as noise to increase a variation ($\Delta X$) in touch raw data. As a result, a touch sensor operates as if it senses a touch input even though the touch sensor is not touched.

FIG. 3 shows touch raw data when a screen displays black gradation and FIG. 4 shows touch raw data when the screen is divided into four areas which display black gradation and white gradation. When white gradation is displayed on the screen as shown in FIG. 4, touch raw data measured during the touch screen driving period (T2 of FIG. 2) is in the range of 60 to 125 irrespective of presence or absence of touch. This is a very high value compared to touch raw data corresponding to black gradation and may exceed a reference value for determining whether touch is applied or not. If touch raw data corresponding to a non-touched point exceeds the reference value, a touch recognition error is generated and sensitivity of the touch sensors is decreased.

SUMMARY

Accordingly, an object of the present invention is to provide a touch sensing apparatus and a driving method thereof for increasing sensitivity of touch sensors mounted in a display device and reducing touch recognition error by minimizing noise inflow due to a data voltage variation.

In one aspect, there is a touch sensing apparatus comprising: a display device including a plurality of pixels and displaying an image; a touch screen including a plurality of touch sensors and being included in the display device; display panel driving circuits for driving the display device; a touch sensing circuit for applying a driving signal to the touch sensors to sense a voltage or capacitance variation in the touch sensors; a controller for time-dividing a first frame period into a first driving period for displaying an image on the display device and a second driving period for sensing the touch sensors; and a reset control circuit for controlling operations of the display panel driving circuits with a reset enable signal to initialize the pixels of the display device to an equivalent reset voltage at predetermined intervals between the first driving period and the second driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Figure 1:
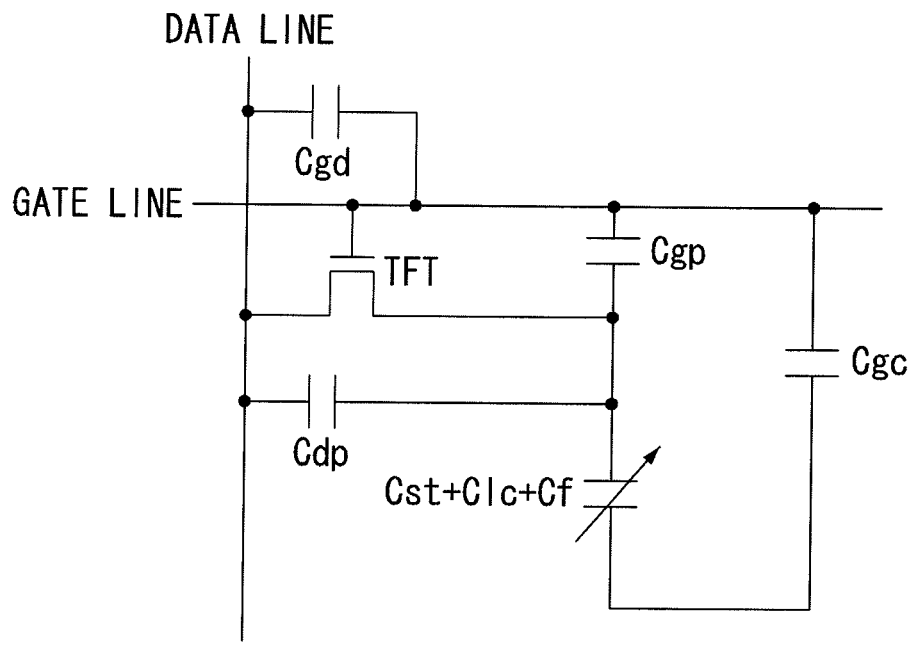
FIG. 1 is an equivalent circuit diagram of a pixel formed in a display panel.
Figure 2:
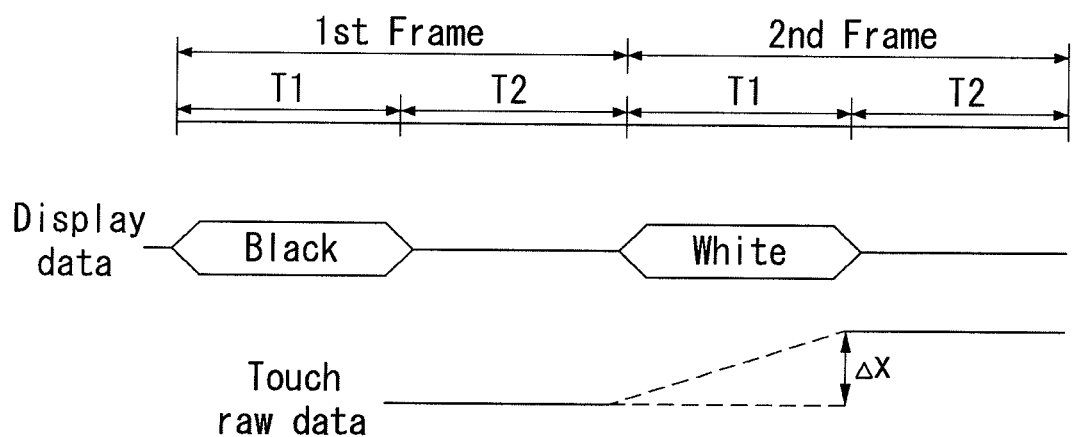
FIG. 2 illustrates noise inflow due to a data voltage variation and a variation in touch raw data caused by noise inflow.
Figure 3:
FIG. 3 shows touch raw data when a screen displays black gradation.
Figure 4:
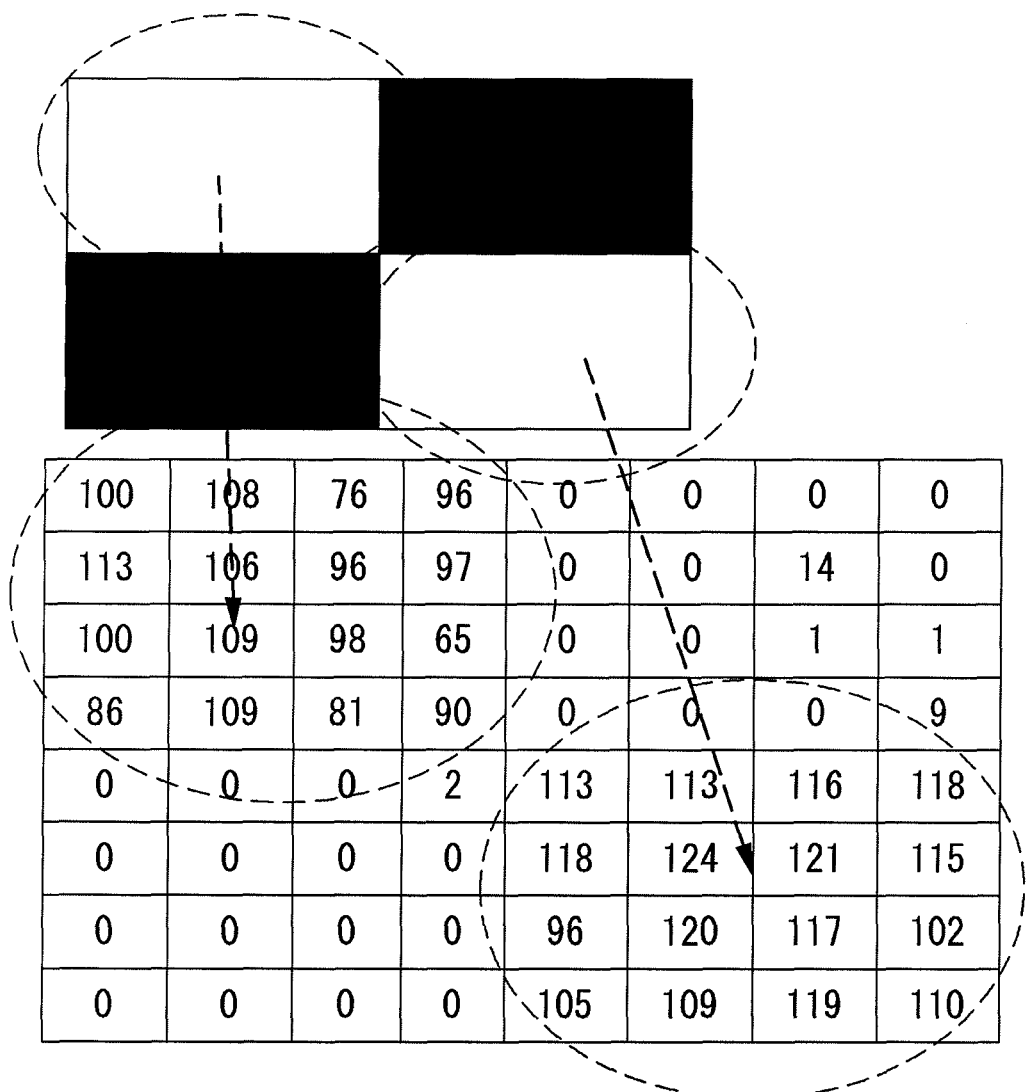
FIG. 4 shows touch raw data when a screen is divided into four areas which display black gradation and white gradation.
Figure 5:
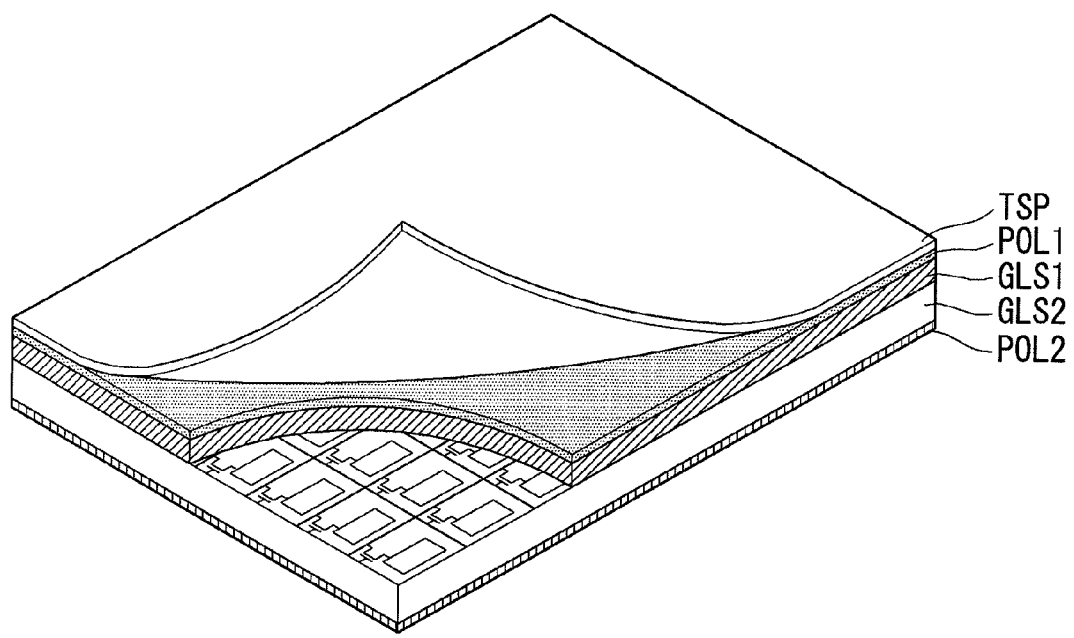
FIGS. 5 to 7 illustrate examples of a touch screen mounted in a display device of a touch sensing apparatus.
Figure 6:
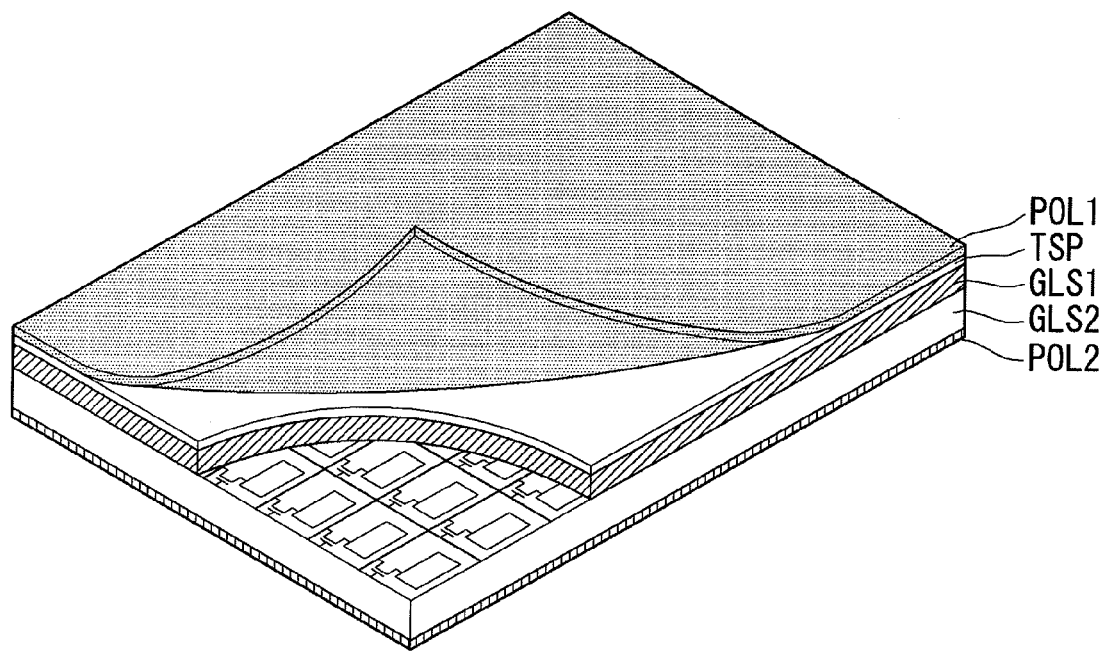
Figure 7:
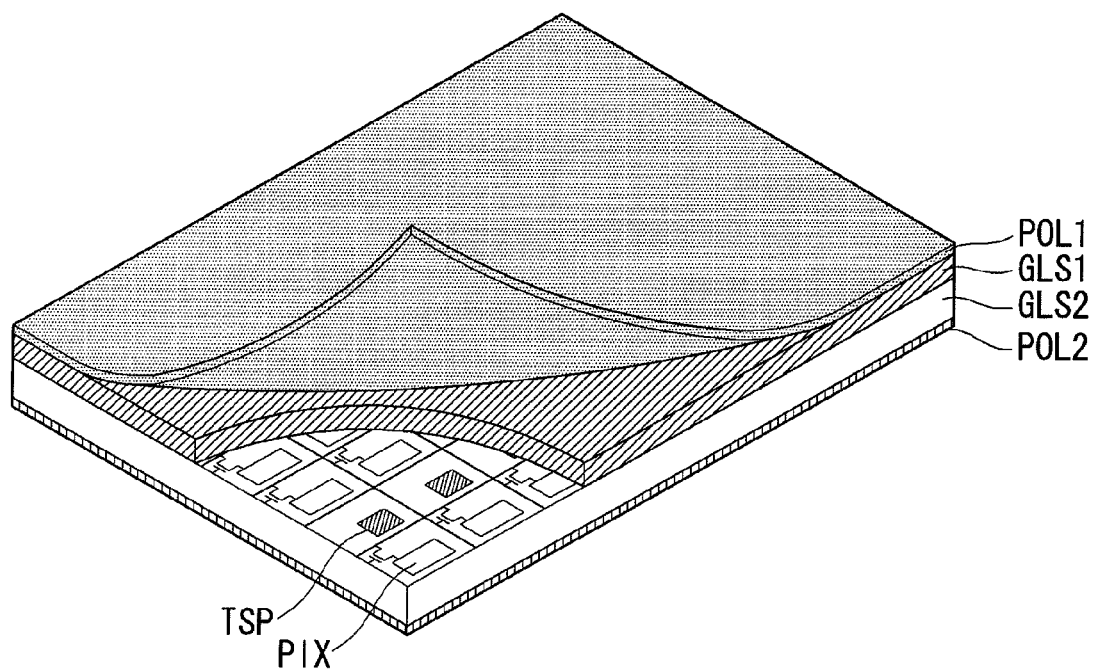

FIGS. 5 to 7 illustrate examples of a touch screen mounted in a display device of a touch sensing apparatus.

A touch sensing apparatus according to an embodiment of the present invention can be implemented on the basis of a flat panel display such as a liquid crystal display (LCD), a field emission display (FED), a plasma display panel (PDP), an organic light emitting display (OLED), an electrophoresis display (EPD), or the like. While a description is given of a display device focusing on the liquid crystal display in the following embodiments, it is noted that the touch sensing apparatus of the present invention is not limited to the liquid crystal display.

The touch sensing apparatus according to the present invention may include a touch screen TSP formed through methods as shown in FIGS. 5 to 7. The touch screen TSP may be bonded to an upper polarizer POL1 of a display panel, as shown in FIG. 5, or formed between the upper polarizer POL1 and an upper glass GLS1 of the display panel, as shown in FIG. 6. Touch sensors of the touch screen TSP may be formed in a pixel array of the display panel, as shown in FIG. 7. In FIGS. 5 to 7, "PIX" denotes a pixel electrode of a liquid crystal cell, "GLS2" denotes a lower glass and "POL2" represents a lower polarizer.

The touch screen TSP of the present invention may be implemented as a capacitive touch screen which senses a touch (or proximity touch) input through a plurality of touch sensors. The touch sensors can have self capacitance or mutual capacitance. Self capacitance can be generated along a single-layer conductive line formed in one direction, and the mutual capacitance can be generated between two conductive lines which intersect each other.

Figure 8:
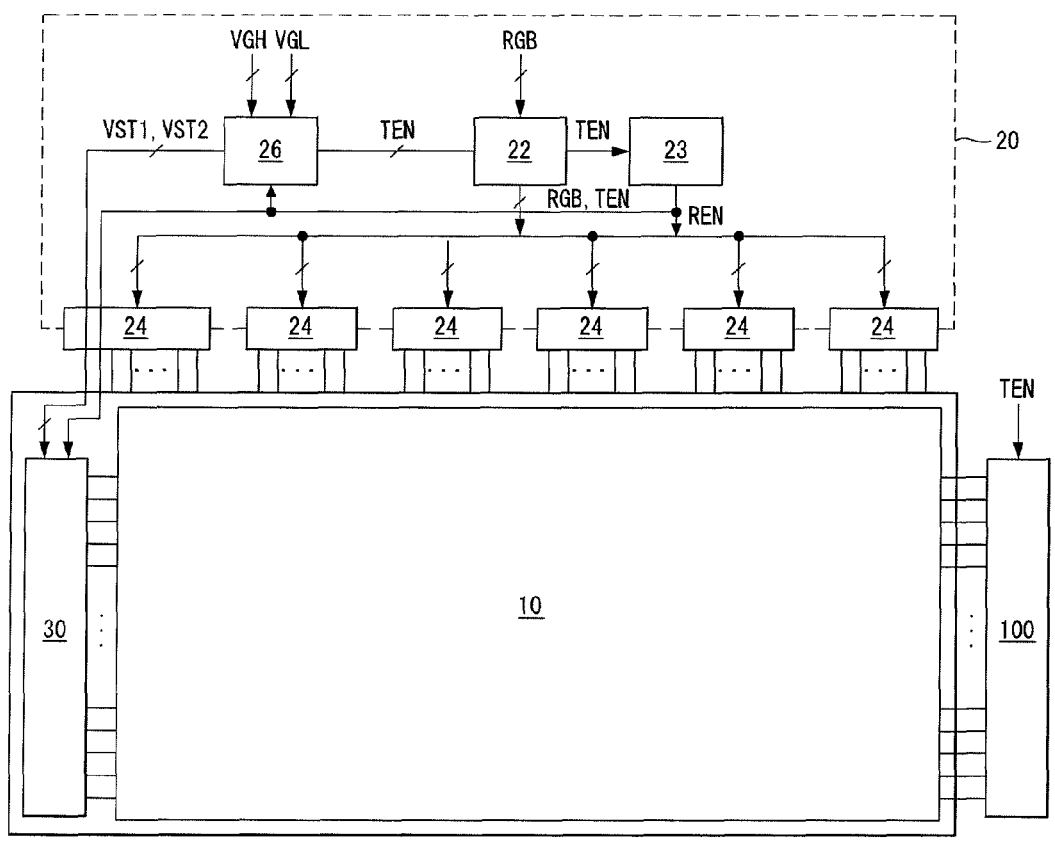
FIG. 8 is a block diagram illustrating a touch sensing apparatus according to an embodiment of the present invention.
Figure 9:
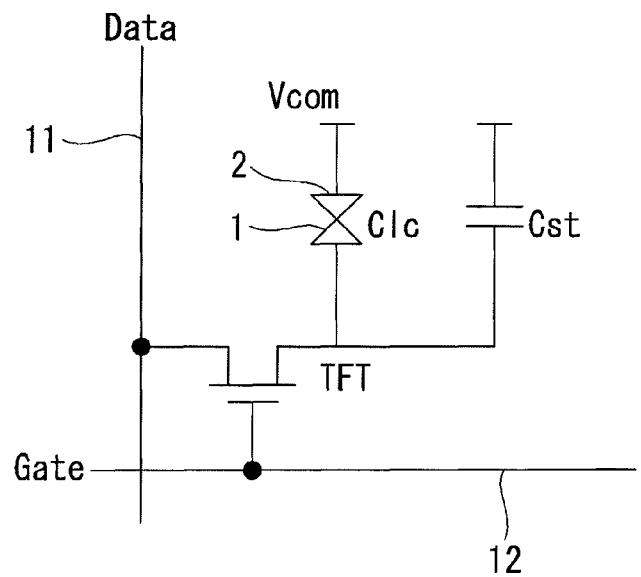
FIG. 9 is an equivalent circuit diagram of a liquid crystal cell formed in a display panel shown in FIG. 8.

FIG. 8 is a block diagram illustrating a touch sensing apparatus according to an embodiment of the present invention and FIG. 9 is an equivalent circuit diagram of a liquid crystal cell formed in a display panel shown in FIG. 8.

Referring to FIGS. 8 and 9, the touch sensing apparatus may include a display panel 10, display panel driving circuits 24, 26 and 30, a timing controller 22, a reset control circuit 23, and a touch sensing circuit 100. The timing controller 22, the reset control circuit 23, the data driving circuit 24 and the touch sensing circuit 100 may be integrated into a single ROIC package.

The display panel 10 includes a liquid crystal layer formed between two substrates. The substrates may be manufactured using glass, plastics, a film, etc. A pixel array formed on the lower substrate of the display panel 10 includes data lines 11, gate lines 12 intersecting the data lines 11, and pixels arranged in a matrix form. The pixel array further includes a plurality of thin film transistors (TFTs) formed at intersections of the data lines 11 and the gate lines 12, pixel electrodes 1 for charging a data voltage in the pixels, and a storage capacitor Cst connected to each pixel electrode to maintain a pixel voltage.

A liquid crystal cell Clc corresponding to each pixel is implemented as a liquid crystal capacitor having the pixel electrode 1 and a common electrode 2 which are opposite to each other with a liquid crystal layer formed therebetween. The liquid crystal cell Clc is driven according to a difference between a data voltage applied to the pixel electrode 1 and a common voltage applied to the common electrode to control transmissivity of light input to the display panel. Each of the TFTs is turned on in response to a gate pulse from the corresponding gate line 12 to provide a data voltage supplied from the corresponding data line 11 to the pixel electrode 1. The common electrode 2 may be formed on the lower substrate or the upper substrate.

The display panel 10 may include a black matrix and a color filter formed on the upper substrate thereof. A polarizer is bonded to each of the upper substrate and the lower substrate and an alignment layer for setting a pretilt angle of the liquid crystal is formed on the inner side of the polarizer, which comes into contact with the liquid crystal. A spacer for maintaining a liquid crystal cell gap is formed between the upper substrate and the lower substrate.

The display panel 10 can be implemented in any of known liquid crystal modes such as a twisted nematic (TN) mode, a vertical alignment (VA) mode, an in-plane switching (IPS) mode, a fringe field switching (FFS) mode, etc. A backlight unit may be arranged on the backside of the display panel 10. The backlight unit is implemented as an edge type or direct type backlight unit and illuminates the display panel 10.

The display panel driving circuits write a data voltage and a reset voltage of an input image to pixels of the display panel 10 using the data driving circuit 24 and the gate driving circuit 26 and 30.

The data driving circuit 24 converts digital video data RGB input from the timing controller 22 to an analog positive/ negative gamma correction voltage to generate a data voltage. The data driving circuit 24 supplies the data voltage to the data lines 11 while inverting the polarity of the data voltage at a predetermined interval under the control of the timing controller 22.

The data driving circuit 24 generates a reset voltage under the control of the reset control circuit 23 and provides the reset voltage to the data lines 11. The reset voltage minimizes the quantity of noise caused by a data voltage variation. Before the touch screen TSP is driven, all the pixels of the display panel 10 are initialized to an equal potential according to the reset voltage. The reset voltage can be generated at a predetermined initialization level. Particularly, the initialization level may correspond to one of a black gradation voltage, a voltage close to the black gradation voltage (i.e. a voltage that belongs to a black gradation range) and a ground voltage such that it is easily generated and is prevented from being recognized as flicker. The black gradation voltage has the same level as the common voltage. The ground voltage is 0V.

The gate driving circuit 26 and 30 supplies a first gate pulse (or scan pulse) synchronized with the data voltage to the gate lines in a line sequential manner to select a pixel line of the display panel 10, to which the data voltage is written, under the control of the timing controller 22. The gate driving circuit 26 and 30 provides a second gate pulse synchronized with the reset voltage to the gate lines under the control of the reset control circuit 23 such that the reset voltage applied to the data lines is written to the pixels of the display panel 10.

The gate driving circuit includes a level shifter 26 and a shift register 30. The shift register 30 can be directly formed on the display panel 10 in virtue of development of GIP (Gate In Panel) processing technique.

The level shifter 26 can be formed on a printed circuit board (PCB) 20 electrically connected to the lower substrate of the display panel 10. The level shifter 26 outputs a first start pulse VST1 and a second start pulse VST2, which swing between a gate high voltage VGH and a gate low voltage VGL, and clock signals CLK under the control of the timing controller 22 and the reset control circuit 23. The gate high voltage VGH is set to a voltage higher than a threshold voltage of the TFTs formed in the pixel array. The gate low voltage VGL is set to a voltage lower than the threshold voltage of the TFTs formed in the pixel array. Phases of the clock signals CLK output from the level shifter 26 are sequentially shifted and the clock signals CLK are transmitted to the shift register 30 formed in the display panel 10.

The shift register 30 is formed at the edge of the lower substrate of the display panel 10 in which the pixel array is formed and connected to the gate lines 12 of the pixel array. The shift register 30 includes a plurality of stages connected in a dependent manner. The shift register 30 starts to operate in response to the first start pulse VST1 input from the level shifter 26, shifts output in response to the clock signals CLK and sequentially provides the first gate pulse to the gate lines of the display panel 10. The shift register 30 can generate output in response to the second start pulse VST2 input from the level shifter 26 to simultaneously provide the second gate pulse to the gate lines of the display panel 10.

The timing controller 22 supplies digital video data input from an external host system to integrated circuits (ICs) of the data driving circuit 24. The timing controller 22 receives timing signals such as a vertical synchronous signal Vsync, a horizontal synchronous signal Hsync, a data enable signal DE and a clock signal and generates timing control signals for controlling operation timing of the data driving circuit 24 and the gate driving circuit 26 and 30. The timing controller 22 generates a touch enable signal TEN for controlling operation timing of the display panel driving circuits and the touch sensing circuit 100.

The reset control circuit 23 generates a reset enable signal REN for controlling timing of writing the reset voltage to the pixels of the display panel 10 to control operations of the display panel driving circuits.

The touch sensing circuit 100 applies a driving signal to interconnection lines connected to the touch sensors of the touch screen to sense a voltage variation or capacitance variation of the touch sensors. The touch sensing circuit 100 generates touch raw data by converting the voltage variation or capacitance variation of the touch sensors into digital data. In addition, the touch sensing circuit 100 analyzes the voltage variation or capacitance variation of the touch sensors by executing a predetermined touch recognition algorithm to detect a touch (or proximity touch) input and the position thereof. The touch sensing circuit 100 transmits touch report data including the coordinates of the touch (or proximity touch) input point to a host system.

The host system may be implemented as one of a navigation system, a set-top box, a DVD player, a Blueray player, a personal computer (PC), a home theater system, a broadcast receiver, and a phone system. The host system converts the format of digital video data corresponding to an input image to a format suitable to the resolution of the display panel 10 using a scaler and transmits a timing signal with the data to the timing controller 22. In addition, the host system executes an application program associated with the touch (or proximity touch) input in response to the touch report data input from the touch sensing circuit 100.

The display panel 10 and the touch screen TSP can be driven in a time division manner.

Figure 10A:
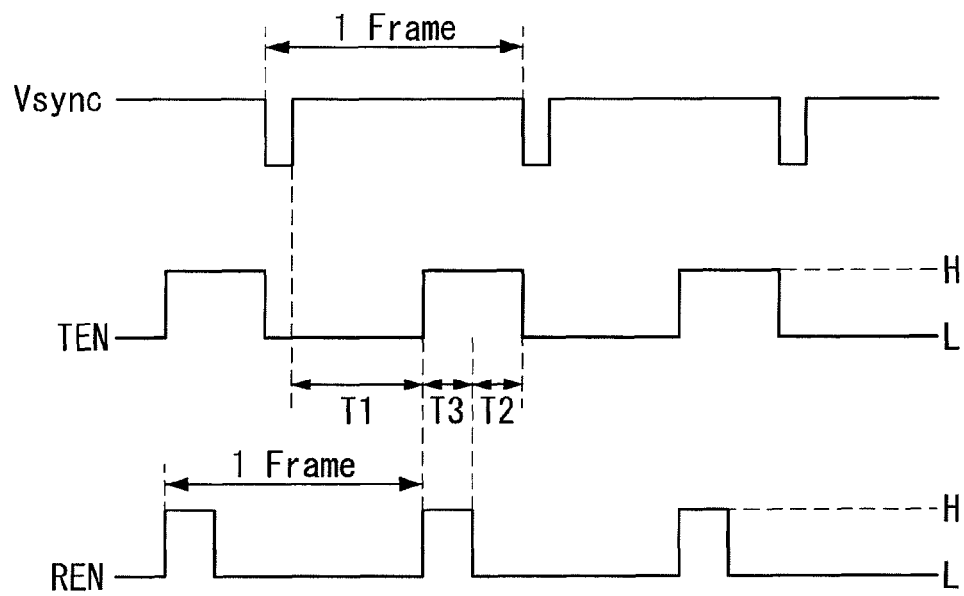
FIGS. 10A to 10C are timing diagrams illustrating reset voltage application timing and time division operations of the display panel and a touch screen.
Figure 10B:
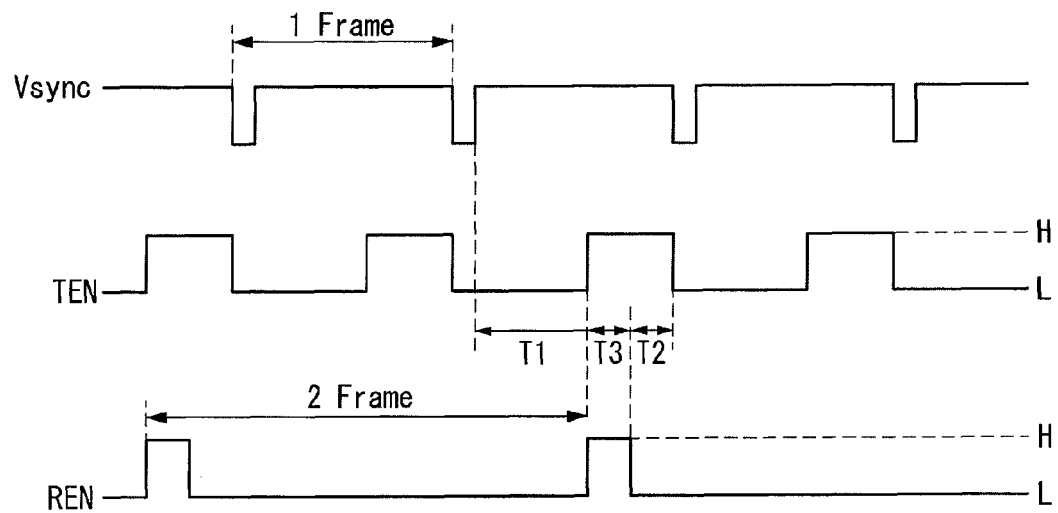
Figure 10C:
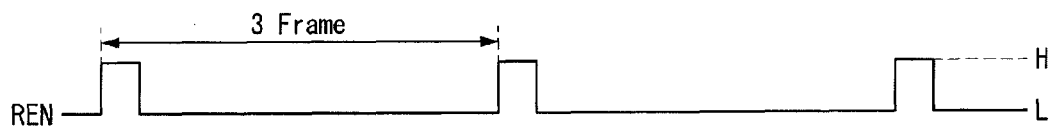

FIGS. 10A to 10C are timing diagrams illustrating reset voltage application timing and time division operations of the display panel 10 and a touch screen TSP.

Referring to FIGS. 10A to 10C, one frame period can be time-divided into a display panel driving period T1 and a touch screen driving period T2 and a reset period T3 can be provided between the display panel driving period T1 and the screen driving period T2 at an interval corresponding to a predetermined frame period.

To define the display panel driving period T1 and the touch screen driving period T2 in one frame period, the timing controller 22 can modulate the vertical synchronous signal Vsync input from the host system to generate the touch enable signal TEN. Alternatively, the timing controller 22 can control the display panel driving period T1 and the touch screen driving period T2 in response to the touch enable signal TEN generated in the host system. Accordingly, a controller which divides one frame period into the display panel driving period T1 and the touch screen driving period T2 and controls operation timings of the display panel driving circuits and the touch sensing circuit 100 may correspond to one of the timing controller and the host system.

While a low logic level period of the touch enable signal TEN can be defined as the display panel driving period T1 and a high logic level period thereof can be defined as the touch screen driving period T2, the present invention is not limited thereto.

In the display panel driving period T1, the display panel driving circuits 24, 26 and 30 are driven whereas the touch sensing circuit 100 is not driven. In the display panel driving period T1, the data driving circuit 24 supplies a data voltage to the data lines 11 under the control of the timing controller 22 and the gate driving circuit 26 and 30 sequentially provides a gate pulse synchronized with the data voltage to the gate lines 12. The touch sensing circuit 100 does not provide a driving signal to the interconnection lines of the touch screen during the display panel driving period T1.

Figure 11:
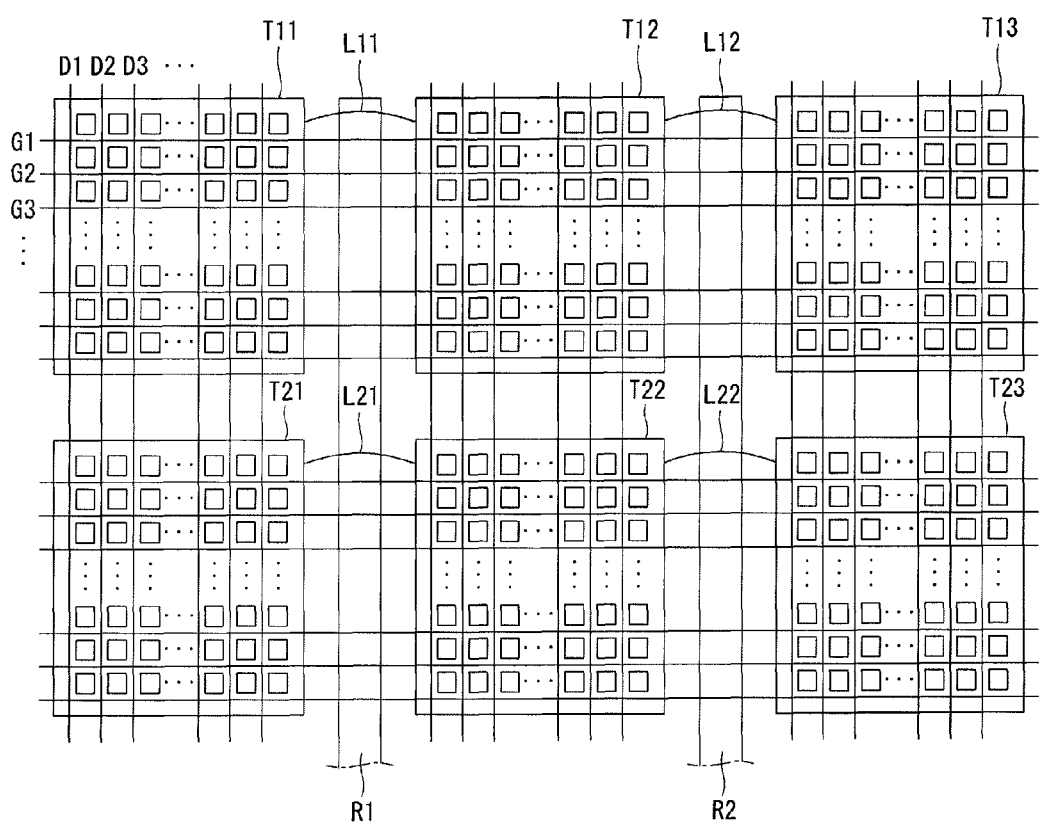
FIGS. 11 to 13 are diagrams for illustrating an interconnection structure of a mutual capacitive touch screen and a touch input sensing principle of the touch screen.
Figure 12:
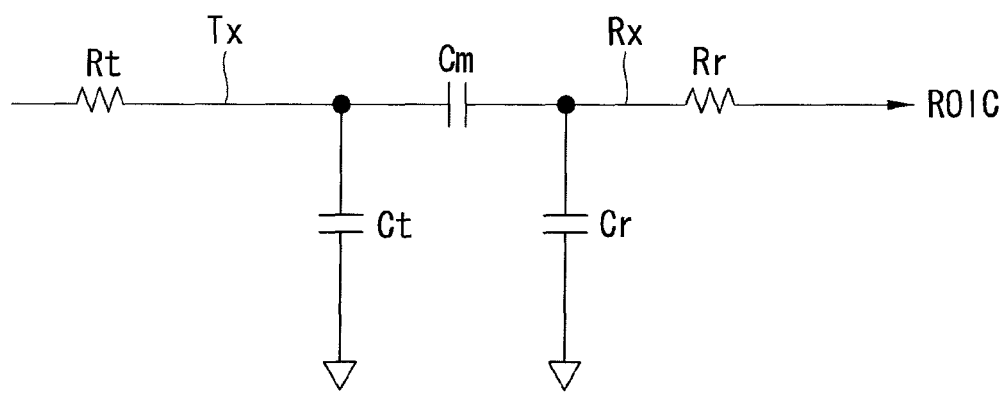
Figure 18:
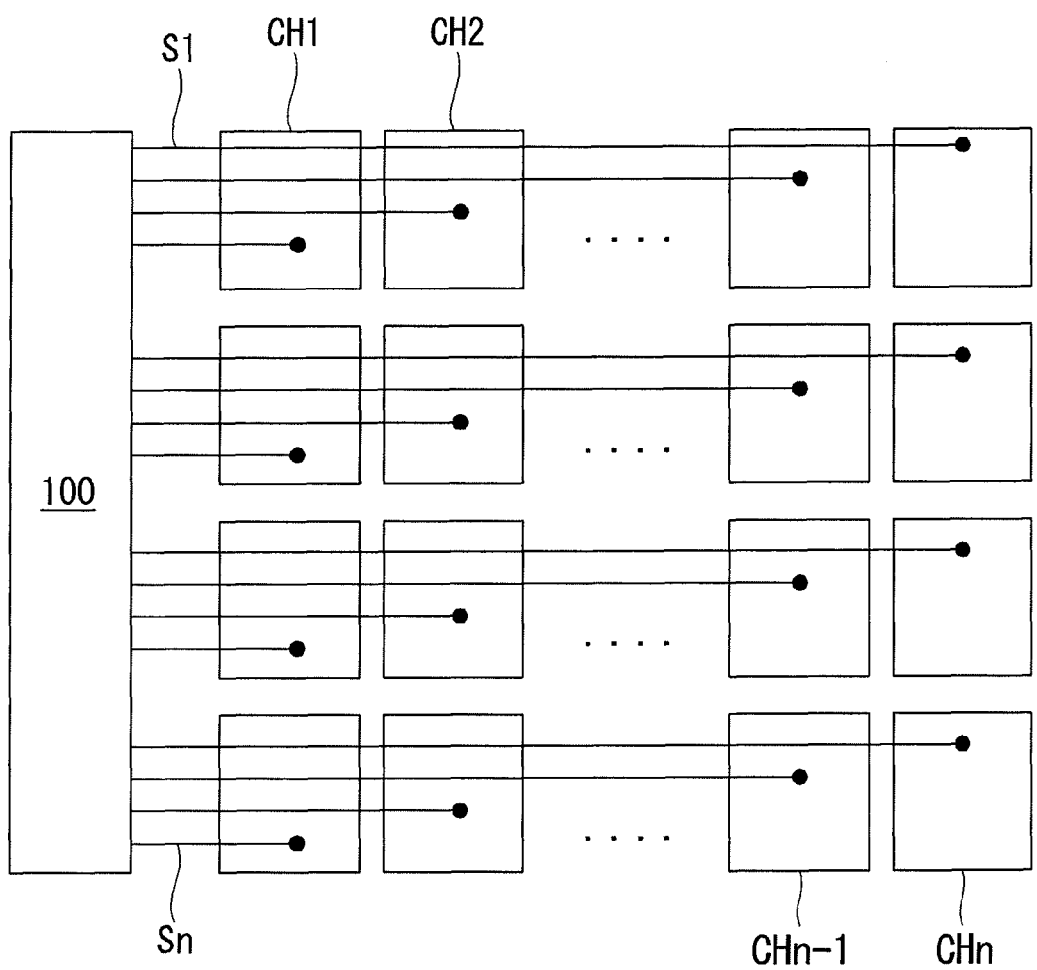
Figure 19:
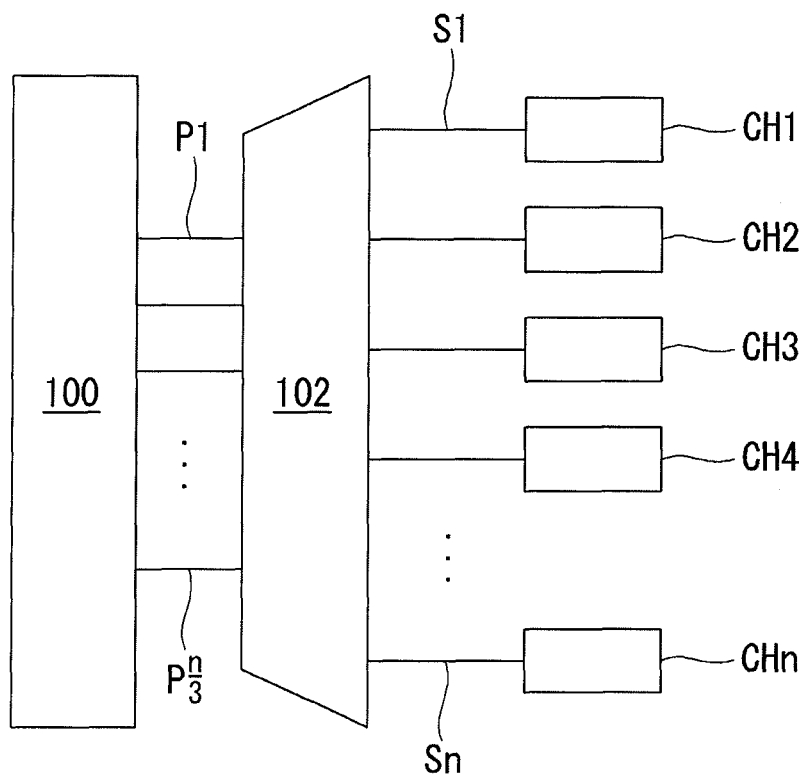
FIGS. 19 and 20 are timing diagrams for illustrating a touch input sensing principle of the self capacitive touch screen.
Figure 20:
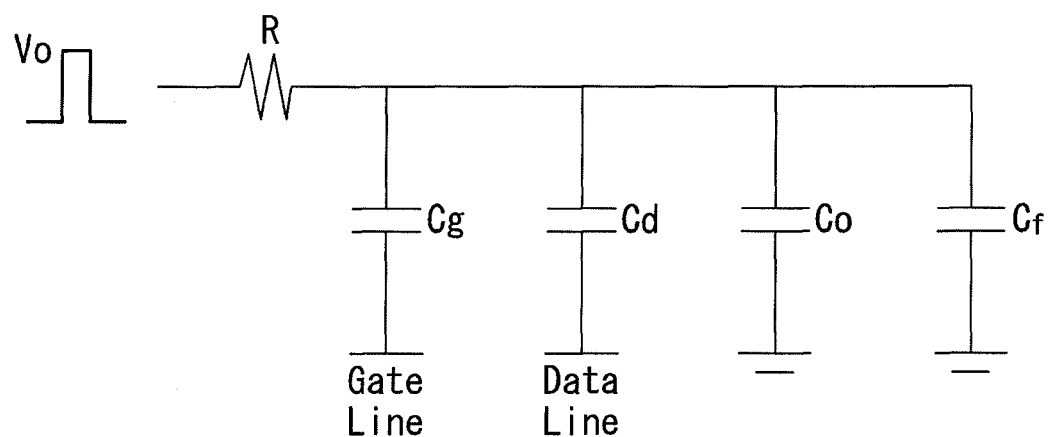

During the touch screen driving period T2, the display panel driving circuits are not driven whereas the touch sensing circuit 100 is driven. The touch sensing circuit 100 applies the driving signal to the interconnection lines connected to the touch sensors to sense a voltage variation or capacitance variation (RC delay) in the touch sensors during the touch screen driving period T2. The interconnection lines of the touch screen TSP may be Tx lines connected to mutual touch sensors as shown in FIGS. 11 and 12 or sensing lines connected to self touch sensors as shown in FIGS. 18 to 20.

The reset period T3 during which the reset voltage is applied can be provided between the display panel driving period T1 and the touch screen driving period T2. To define the reset period T3, the reset control circuit 23 can generate the reset enable signal REN on the basis of the touch enable signal TEN. While the reset control circuit 23 can generate the reset enable signal REN as a high logic level in the reset period T3, the reset enable signal REN is not limited thereto and can be generated as a low logic level.

The reset period T3 can be arranged between the display panel driving period T1 and the touch screen driving period T2 at an interval of N (N being a natural number larger tan 1) frames according to the reset enable signal REN.

For example, the reset period T3 can be provided between the display panel driving period T1 and the touch screen driving period T2 for every frame and repeated on a frame-by-frame basis, as shown in FIG. 10A. Since luminance is expected to decrease due to the reset period T3 when the reset voltage applied to the display panel during the reset period T3 corresponds or is similar to the black gradation voltage, the touch sensing apparatus of the present invention may further include a backlight control circuit (not shown) for compensating for a luminance decrease during the reset period T3 by controlling at least one of a dimming rate and a light source driving current of the backlight unit.

The reset period T3 may be repeated at an interval of two frames, as shown in FIG. 10B, or repeated at an interval of three frames, as shown in FIG. 10C, according to the reset enable signal REN. Because the duration of a user's touch is much longer than one frame period in general, touch quality is not affected even when the repetition cycle of the reset period T3 is set to two frames or three frames.

Figure 13:
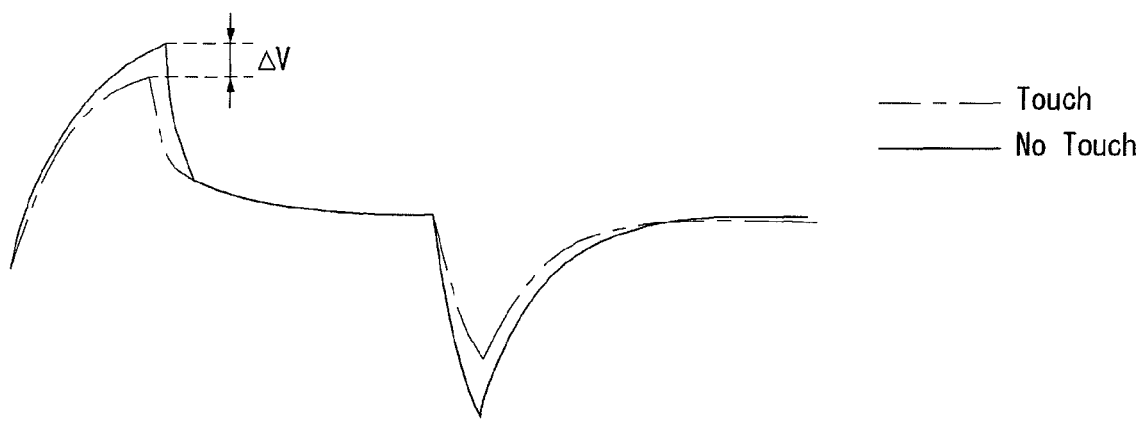
Figure 14:
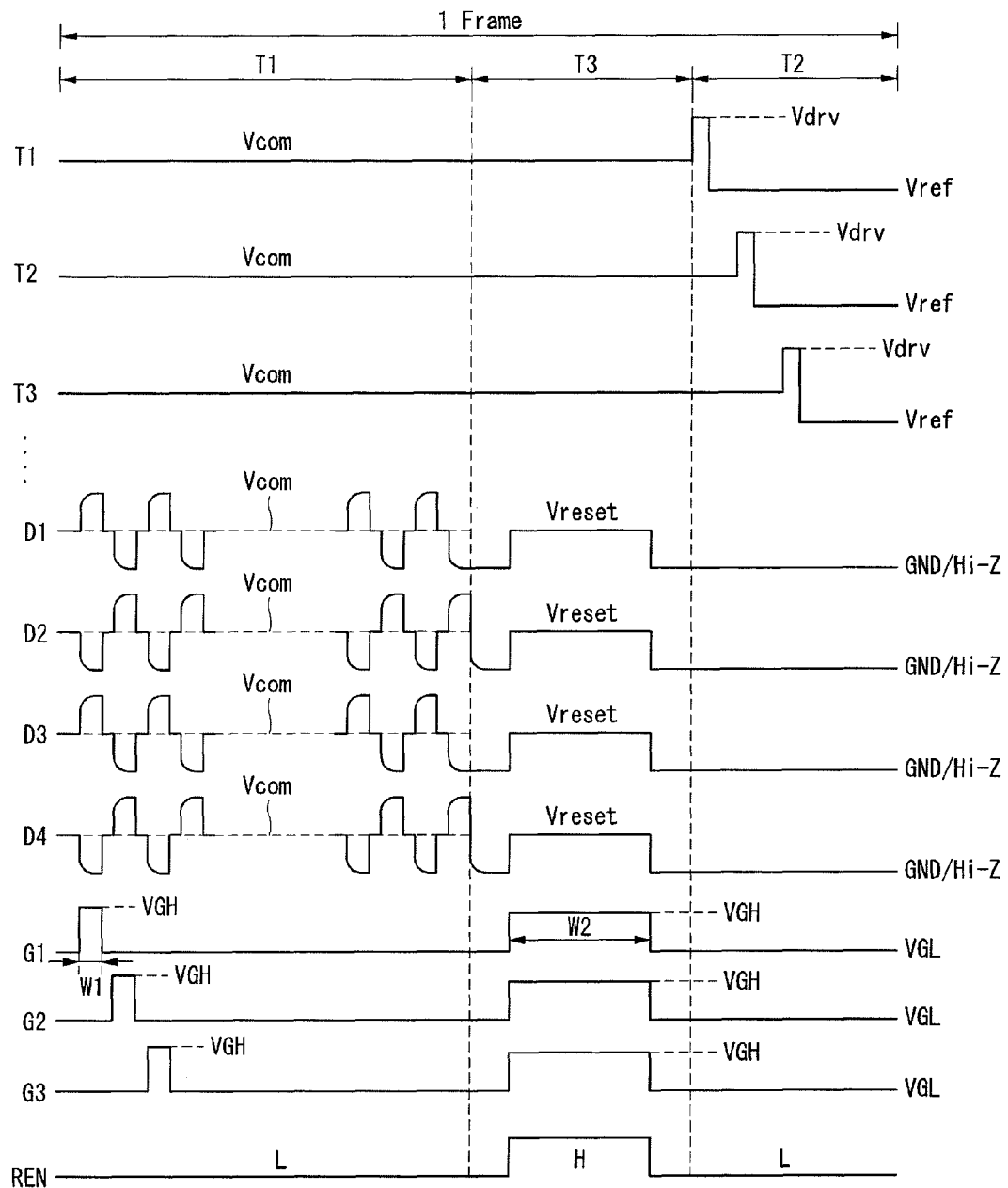
FIGS. 14 and 15 are timing diagrams for illustrating a 1-frame driving method including different reset operations in the mutual capacitive touch screen.
Figure 15:
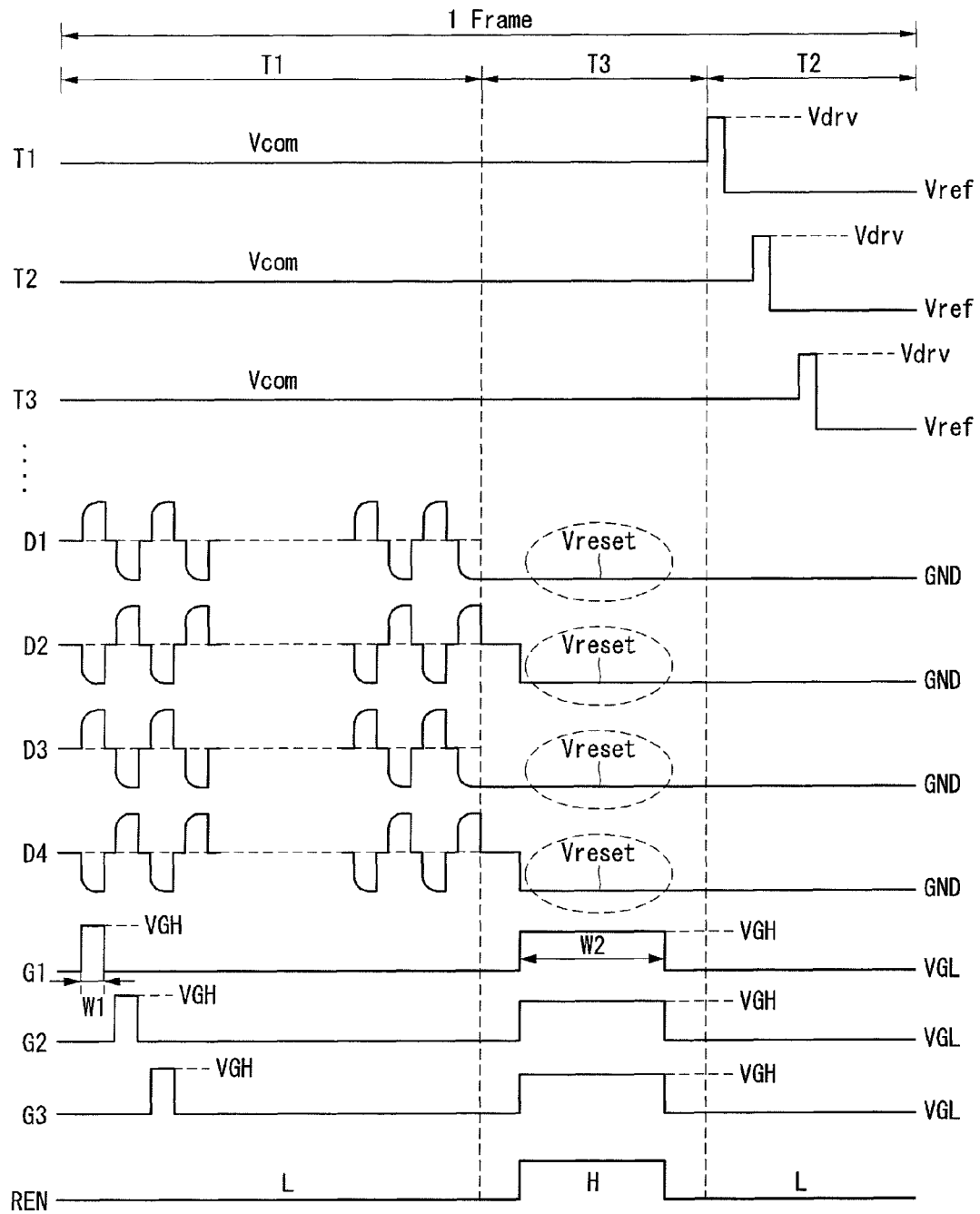
Figure 16:
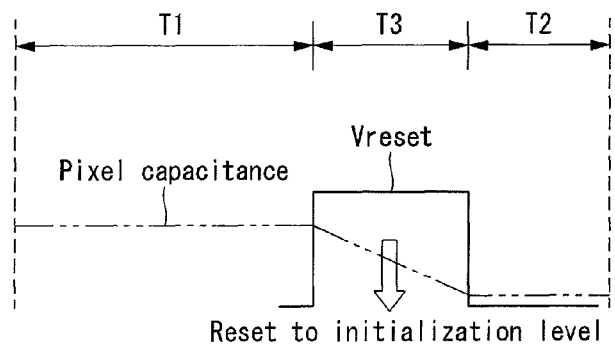
FIG. 16 illustrates initialization of pixel capacitance according to a reset voltage.

FIGS. 11 to 13 are diagrams for illustrating an interconnection structure and a touch recognition method of a mutual capacitive touch screen TSP and FIGS. 14 and 15 are timing diagrams illustrating a 1-frame driving method including different reset operations of the mutual capacitive touch screen TSP. FIG. 16 illustrates initialization of pixel capacitance (pixel capacitance and parasitic capacitance) due to a reset voltage.

Referring to FIGS. 11 and 12, the mutual capacitive touch screen TSP includes Tx lines and Rx lines R1 and R2 which intersect the Tx lines. A mutual capacitance Cm is formed at each of intersections of the Tx lines and the Rx lines R1 and R2. In FIG. 12, "Ct" denotes a parasitic capacitance connected to a Tx line, "Cr" denotes a parasitic capacitance connected to an Rx line, "Rx" represents a line resistance of the Tx line, and "Rr" represents a line resistance of the Rx line.

The Tx lines include touch electrode patterns T11 to T23 connected through link patterns L11 to L22 in the lateral (or horizontal) direction of the display panel 10. The first Tx line includes touch electrode patterns T11 to T13 connected through link patterns L11 and L12 in the horizontal direction.

The second Tx line includes touch electrode patterns T21 to T23 connected through link patterns L21 and L22 in the horizontal direction. The size of each of the touch electrode patterns T11 to T23 is greater than the size of each pixel and the touch electrode patterns T11 to T23 are superposed on a plurality of pixels. The touch electrode patterns T11 to T23 are superposed on the pixel electrodes 1 having an insulating layer formed therebetween. The touch electrode patterns T11 to T23 may be formed of a conductive material such as ITO (Indium Tin Oxide). The link patterns L11 to L22 electrically connect adjacent touch electrode patterns in the lateral (horizontal) direction across the Rx lines R1 and R2. The link patterns L11 to L22 may be superposed on the Rx lines R1 and R2 with an insulating layer interposed therebetween. The link patterns L11 to L22 may be formed of a metal such as metal aluminum (Al), aluminum medium (AlNd), molybdenum (Mo), chrome (Cr), copper (Cu), silver (Ag), etc. or a transparent conductive material.

The Rx lines R1 and R2 are formed in the longitudinal (or vertical) direction of the display panel 10 and intersect the Tx lines. The Rx lines R1 and R2 may be formed of a transparent conductive material such as ITO. The Rx lines R1 and R2 may be superposed on a plurality of pixels (not shown). The Rx lines R1 and R2 may be formed on the upper substrate or lower substrate of the display panel 10.

In the mutual capacitive touch screen TSP, the touch electrode patterns T11 to T23 may be formed by patterning the common electrode 2. The Rx lines R1 and R2 may be formed on the front side or backside of the upper or lower substrate of the display panel 10. The data lines 11 of the display panel 10 may be used as the Rx lines R1 and R2. Alternatively, the Rx lines R1 and R2 may be implemented as interconnection lines separated from the data lines 11.

In the mutual capacitive touch screen TSP, a voltage charged in the touch sensors decreases when the touch screen is touched compared to a level when the touch screen is not touched, as shown in FIG. 13. The touch sensing circuit 100 senses a voltage variation (ΔV) of the touch sensor before and after an touch input is applied and determines that the currently sensed touch sensor as a sensor corresponding to the touch (or proximity touch) input point when the voltage variation exceeds a predetermined reference value.

The 1-frame driving method including reset operations in the mutual capacitive touch screen TSP is described with reference to FIGS. 14 and 15.

During the display panel driving period T1, a common voltage Vcom is supplied to the Tx lines T11 to T23 and L11 to L22. Accordingly, the Tx lines operate as common electrodes during the display panel driving period T1 and are used as driving signal lines for applying a driving signal to touch sensors having mutual capacitance during the touch screen driving period T2.

The touch sensing circuit 100 is connected to the Tx lines T11 to T23 and L11 to L22 and the Rx lines R1 and R2. The touch sensing circuit 100 is disabled during the display panel driving period T1 and enabled during the touch screen driving period T2 to sequentially supply a driving signal to the Tx lines T11 to T23 and L11 to L22 and receive voltages of the touch sensors through the Rx lines only in the touch screen driving period T2. The driving signal swings between a driving voltage Vdrv and a reference voltage Vref. In FIGS. 14 and 15, "D1 to D4" denote data lines of the display panel 10 and "G1 to G3" denote gate lines of the display panel 10. During the touch screen driving period, the data lines D1 to D4 can be floated (Hi-Z) or connected to the ground (GND) and may be coupled to an arbitrary DC voltage or gradation voltage.

The touch sensing circuit 100 samples the voltages of the touch sensors, received through the Rx lines R1 and R2, and accumulates the sampled voltages in capacitors of an integrator. The touch sensing circuit 100 converts the voltages charged in the capacitors of the integrator into digital data, compares the digital data with a predetermined threshold value and determines data higher than the threshold value as touch data corresponding to a touch (or proximity touch) input point.

During the reset period T3, the touch sensing circuit 100 is disabled and the display panel driving circuits are enabled. The reset period T3 is provided between the display panel driving period T1 and the touch screen driving period T2 in a corresponding frame. During the reset period T3, the display panel driving circuits can simultaneously provide a reset voltage Vreset to the pixels of the display panel 10. While the reset voltage Vreset can be supplied to the pixels in a line sequential manner in the reset period T3, it is preferable to simultaneously supply the reset voltage Vreset to the pixels in order to obtain sufficient reset effect within a restricted time. Furthermore, when the reset voltage Vreset is applied in the line sequential manner, the reset period T3 increases, and thus the touch screen driving period T2 decreases. In view of this, it is more preferable to simultaneously supply the reset voltage Vreset to the pixels.

For simultaneous supply of the reset voltage Vreset, the data driving circuit 24 may generate a black gradation voltage (or a voltage similar to the black gradation voltage) corresponding to the common voltage Vcom and supply the black gradation voltage to the data lines D1 to D4, as shown in FIG. 14, or generate a ground voltage (GND) and supply the ground voltage to the data lines D1 to D4, as shown in FIG. 15. Here, the gate driving circuit may generate a second gate pulse synchronized with the reset voltage Vreset and simultaneously provide the second gate pulse to the gate lines G1 to G3. All the TFTs included in the display panel 10 are simultaneously turned on in response to the second gate pulse, and thus the reset voltage Vreset can be applied to all the pixels of the display panel. Since the second gate pulse are simultaneously supplied to the gate lines, the second gate pulse can be generated such that it has a pulse width (W2) greater than that of the first gate pulse applied in a line sequential manner during the display panel driving period T1 (W2>W1). When the second gate pulse has a wider pulse width (W2), reset effect can be improved as described above.

The reset voltage Vreset is an initialization voltage applied to the pixels before the touch screen TSP is driven. All capacitances of the pixels including pixel capacitance and parasitic capacitance are initialized to an equal potential, as shown in FIG. 16. Accordingly, even if the pixel capacitance is changed due to a data voltage variation, the pixel capacitance change is prevented from being applied as noise to the voltages of the touch sensors because the pixel capacitance is initialized to a specific value according to a reset operation. According to the present invention, it is possible to remarkably reduce touch recognition error, which is generated when a touch sensor senses a touch input even though no touch is applied, and increase the sensitivity of touch sensors so as to improve touch reliability.

Figure 17:
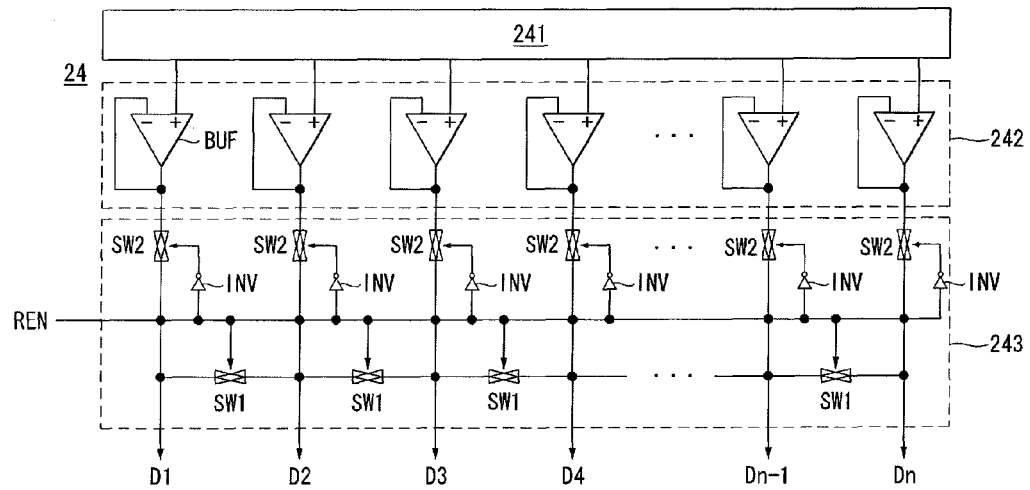
FIGS. 17 and 18 illustrate an interconnection structure of a self capacitive touch screen and a touch input sensing principle of the touch screen.
Figure 21:
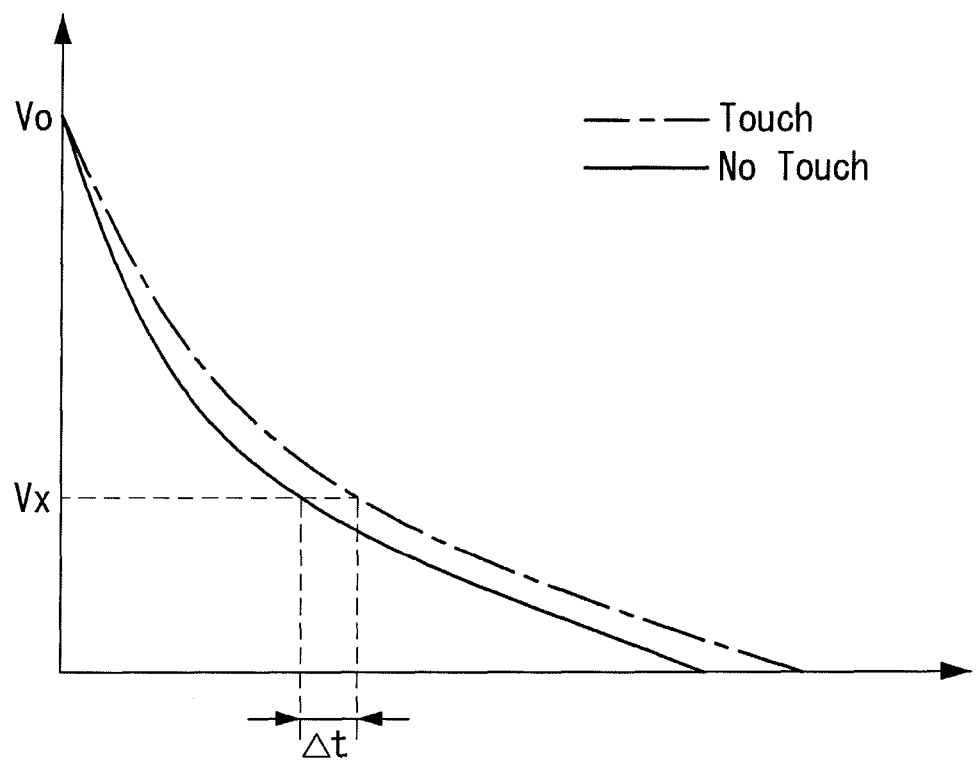
FIGS. 21 and 22 are timing diagrams for illustrating a 1-frame driving method including different reset operations in the self capacitive touch screen.
Figure 22:
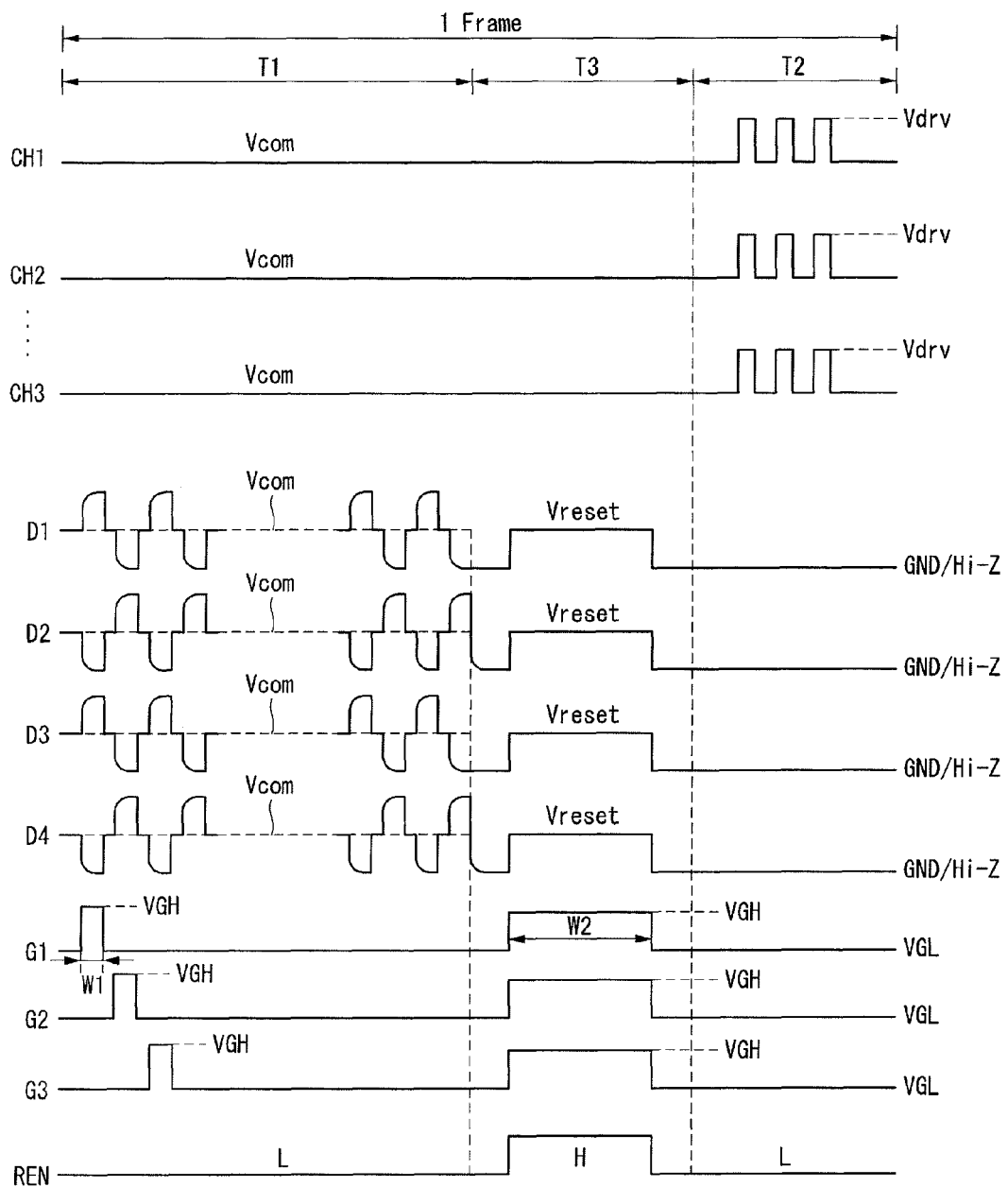

FIGS. 17 and 18 illustrate an interconnection structure and a touch recognition method of a self capacitive touch screen TSP. FIG. 19 is an equivalent circuit diagram illustrating the self capacitive touch screen TSP and FIG. 20 is a waveform diagram illustrating a touch input sensing principle of the self capacitive touch screen TSP. FIGS. 21 and 22 are waveform diagrams for illustrating a 1-frame driving method including different reset operations of the self capacitive touch screen TSP.

Referring to FIGS. 17 and 18, the self capacitive touch screen TSP includes touch electrode patterns CH1 to CHn. Each of the touch electrode patterns CH1 to CHn is larger than each pixel. The touch electrode patterns CH1 to CHn correspond to transparent electrode patterns superposed on a plurality of pixels and are formed in the pixel array. A self touch sensor includes each touch electrode pattern. Each of the touch electrode patterns CH1 to CHn functions as both the common electrode 2 and an electrode of the self touch sensor.

The touch sensing circuit 100 can be one-to-one connected to the touch electrode patterns CH1 to CHn through sensing lines S1 to Sn. The touch electrode patterns CH1 to CHn are provided with the common voltage Vcom through the sensing lines S1 to Sn during the display panel driving period T1 and provided with driving signals as shown in FIGS. 21 and 22 through the sensing lines S1 to Sn during the touch screen driving period T2. Accordingly, the touch electrode patterns CH1 to CHn operate as the common electrode 2 during the display panel driving period T1 and are used as electrodes for sensing self touch sensors during the touch screen driving period T2.

The touch sensing circuit 100 is disabled during the display panel driving period T1 and enabled during the touch screen driving period T2 to simultaneously supply the driving signals as shown in FIGS. 21 and 22 to the sensing lines S1 to Sn only in the touch screen driving period T2.

To reduce the number of input/output channel pins of the touch sensing circuit 100, a multiplexer 102 as shown in FIG. 18 may be provided between the touch sensing circuit 100 and the sensing lines S1 to Sn in the self capacitive touch screen TSP. When the multiplexer 102 is a 1:N (N being a positive integer greater than 2 and smaller than n) multiplexer, n/N input/output pins through which driving signals are output from the touch sensing circuit 100 are connected to input terminals of the multiplexer 102. In the multiplexer 102, n output terminals are one-to-one connected to the sensing lines S1 to Sn. Accordingly, the present invention can decrease the number of pins of the touch sensing circuit 100 using the multiplexer 102.

Provided that the sensing lines S1 to Sn are divided into three groups, n/3 input/output pins P1 to Pn/3 of the multiplexer 102 are connected to sensing lines of a first group such that a driving signal is simultaneously supplied to touch sensors connected to the sensing lines of the first group. Subsequently, n/3 input/output pins P1 to Pn/3 of the multiplexer 102 are connected to sensing lines of a second group such that the driving signal is simultaneously supplied to touch sensors connected to the sensing lines of the second group. Then, n/3 input/output pins P1 to Pn/3 of the multiplexer 102 are connected to sensing lines of a third group such that the driving signal is simultaneously supplied to touch sensors connected to the sensing lines of the third group. Accordingly, the touch sensing circuit 100 can provide the driving signal to the n touch electrode patterns CH1 to CHn through n/3 pins.

The touch input sensing principle of the self capacitive touch screen TSP will now be described with reference to FIGS. 19 and 20. The self capacitive touch screen TSP includes a resistance R and parasitic capacitances Cg, Cd and Co. The resistance R includes a line resistance and a parasitic resistance of the touch screen TSP and the display panel 10. In FIG. 19, Cg is a parasitic capacitance generated between an interconnection line of the touch screen TSP and the gate line 12 and Cd is a parasitic capacitance generated between the interconnection line of the touch screen TSP and the data line 11. Co is a parasitic capacitance generated between components other than the data line 11 and the gate line 12 and the interconnection line of the touch screen TSP.

When a driving signal Vo is applied to the interconnection line of the touch screen TSP, a rising edge and a falling edge of the driving signal Vo are delayed by an RC delay determined according to the resistance R and the parasitic capacitances Cg, Cd and Co. When a conductor or a finger touches the touch screen TSP, capacitance is increased by Cf so as to further increase the RC delay in FIG. 19. In FIG. 20, a solid line shows a falling edge of the driving signal Vo when no touch is applied to the touch screen TSP and a dotted line shows a falling edge of the driving signal Vo when a touch input is applied to the touch screen TSP. The touch sensing circuit 100 compares at least one of the rising edge and the falling edge of the driving signal with a predetermined reference voltage value Vx. The touch sensing circuit 100 senses a capacitance variation of a touch sensor by counting a delay time from the at least one of the rising edge and the falling edge of the driving signal to the reference voltage value Vx. Information on reference time taken to reach the reference voltage value Vx is previously stored in the touch sensing circuit 100. The touch sensing circuit 100 determines the currently sensed self touch sensor as a sensor corresponding to a touch (or proximity touch) input point when a time difference Δt between the delay time of the driving signal, measured by a counter in real time, and the predetermined reference time information exceeds a predetermined threshold value.

A 1-frame driving method including reset operations of the self capacitive touch screen TSP will now be described with reference to FIGS. 21 and 22.

The common voltage Vcom is supplied to touch electrode patterns CH1 to CH3 during the display panel driving period T1. Accordingly, the touch electrode patterns CH1 to CH3 operate as common electrodes during the display panel driving period T1 and are used as touch sensors having self capacitance during the touch screen driving period T2.

The touch sensing circuit 100 is connected to the touch electrode patterns CH1 to CH3. The touch sensing circuit 100 is disabled during the display panel driving period T1 and enabled during the touch screen driving period T2 to simultaneously supply a driving signal to the touch electrode patterns CH1 to CH3 and receive capacitance variations of touch sensors only in the touch screen driving period T2. The driving signal swings between a driving voltage Vdry and the common voltage Vcom. In FIGS. 21 and 22, "D1 to D4" are data lines of the display panel 10 and "G1 to G3" are gate lines of the display panel 10. The data lines D1 to D4 may be floated (Hi-Z) or provided with a ground voltage GND during the touch screen driving period T2. Additionally, the data lines D1 to D3 may be provided with an arbitrary current voltage or gradation voltage during the touch screen driving period T2.

To sense a capacitance variation of a touch sensor, the touch sensing circuit 100 checks whether a time difference Δt between a delay in the driving signal, measured by a counter in real time, and predetermined reference time information exceeds a predetermined threshold voltage and recognizes data that exceeds the threshold value as touch data corresponding to a touch (or proximity touch) input point.

The touch sensing circuit 100 is disabled whereas the display panel driving circuits are enabled during the reset period T3. The reset period T3 is arranged between the display panel driving period T1 and the touch screen driving period T2 in a corresponding frame. The display panel driving circuits can simultaneously provide the reset voltage Vreset to the pixels of the display panel 10 during the reset period T3.

For simultaneous supply of the reset voltage Vreset, the data driving circuit 24 may generate a black gradation voltage (or voltage close to the black gradation voltage) corresponding to the common voltage Vcom and provide the black gradation voltage to the data lines D1 to D4, as shown in FIG. 21, or generate a voltage corresponding to the ground voltage GND and supply the voltage to the data lines D1 to D4, as shown in FIG. 22. Here, the gate driving circuit may generate a second gate pulse synchronized with the reset voltage Vreset and simultaneously provide the second gate pulse to the gate lines G1 to G3. All the TFTs included in the display panel 10 are simultaneously turned on in response to the second gate pulse, and thus the reset voltage Vreset can be simultaneously applied to all the pixels of the display panel. Since the second gate pulse is simultaneously applied to the pixels, the second gate pulse can be generated such that it has a pulse width (W2>W1) wider than the first gate pulse which is applied in a line sequential manner during the display panel driving period T1. When the pulse width (W2) of the second gate pulse is wider, reset effect can be improved.

The reset voltage Vreset is an initialization voltage applied to the pixels before the touch screen TSP is driven. All capacitances of the pixels including pixel capacitance and parasitic capacitance are initialized to an equal potential, as shown in FIG. 16. Accordingly, even if the pixel capacitance is changed due to a data voltage variation, the pixel capacitance change is prevented from being applied as noise to the voltages of the touch sensors because the pixel capacitance is initialized to a specific value according to a reset operation. According to the present invention, it is possible to remarkably reduce touch recognition error, which is generated when a touch sensor senses a touch input even though no touch is applied, and increase the sensitivity of touch sensors so as to improve touch reliability.

Figure 23:
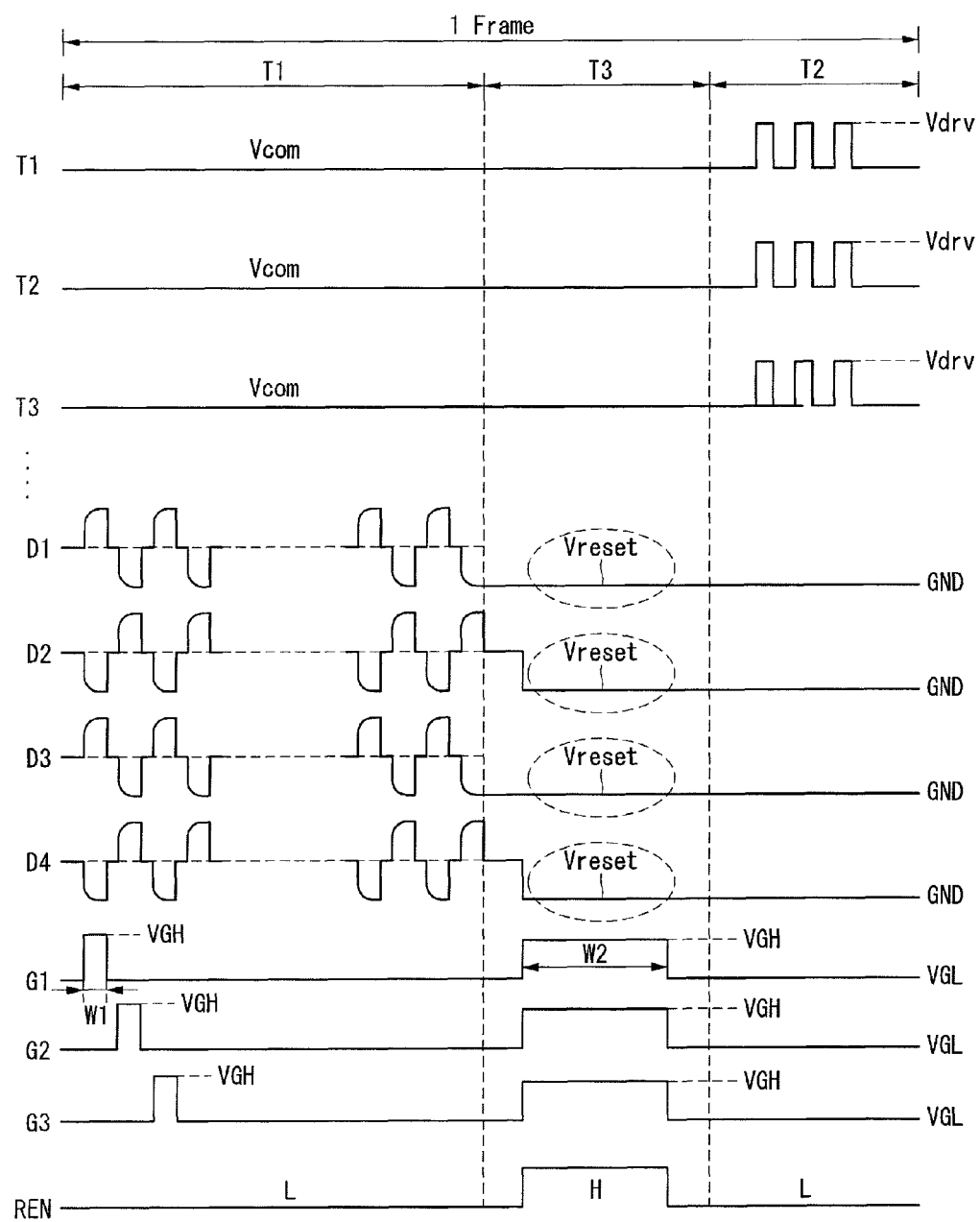
FIG. 23 illustrates an operation of a data driving circuit for generating a black gradation voltage as an example of a reset voltage in a reset period.

FIG. 23 illustrates an operation of the data driving circuit 24 to generate a black gradation voltage as an example of the reset voltage in the reset period.

The data driving circuit 24 can perform a charge sharing operation to generate the black gradation voltage or a voltage similar to the black gradation voltage during the reset period T3. Charge sharing is to make the reset voltage simultaneously applied to all the data lines be equal or similar to the black gradation voltage by short-circuiting first output channels through which a positive (+) data voltage is output and second output channels through which a negative (−) data voltage is output in the data driving circuit 24.

For charge sharing, the data driving circuit 24 further includes a charge share circuit 243 in addition to a data voltage generator 241 and an output circuit 242. The data voltage generator 241 includes a shift register, a latch array, a gamma correction voltage generator, a digital-to-analog converter, etc.

The output circuit 242 includes a plurality of buffers BUF which are one-to-one connected to the data output channels to minimize signal attenuation of an analog data voltage supplied from the data voltage generator 241.

The charge share circuit 243 includes a plurality of first switches SW1 each of which is connected between neighboring output channels, a plurality of second switches SW2 each of which is connected between the output terminal of each buffer BUF and each output channel, and a plurality of inverters INV for inverting the reset enable signal REN.

During the display panel driving period T1 and the touch screen driving period T2, the first switches SW1 are turned off in response to the reset enable signal REN at a turn-off level and the second switches SW2 are turned on in response to a turn-on level of the reset enable signal REN inverted by the inverters INV. Since the reset enable signal REN at the turn-on level is applied to the data driving circuit 24 in the reset period T3, the first switches SW1 is turned on whereas the second switches SW2 are turned off. Charging sharing is performed according to the turned on first switches SW1, and thus the reset voltage at the common voltage level corresponding to black gradation is output to all the data lines D1 to Dn.

Alternatively, the black gradation voltage as an example of the reset voltage may be generated by a method other than charge sharing, which is not shown. That is, the data driving circuit 24 can apply a black gradation code "00000000" previously set therein to the data voltage generator 241 in response to the reset enable signal REN, generate the black gradation voltage through the data voltage generator 241, and then provide the black gradation voltage to all the data lines.

The data driving circuit 24 may generate the ground voltage as an example of the reset voltage. The date driving circuit 24 can generate the ground voltage by controlling a bias voltage of the buffers BUF which form the output circuit 242 in response to the reset enable signal REN and supply the ground voltage to all the data lines.

As described above, the touch sensing apparatus and driving method thereof according to the present invention prevent a data voltage variation according to an input image from being applied as touch noise by initializing all the pixels of the display panel to an equivalent reset voltage during a period between the display panel driving period and the touch screen driving period at predetermined intervals. Since the reset voltage for initializing pixel capacitance is a specific offset value, calculation of touch coordinates can be easily eliminated when a touch algorithm is applied.

The present invention increases sensitivity of touch sensors mounted in a display device by minimizing noise inflow according to a data voltage variation and remarkably reduces touch recognition error, thereby improving touch reliability.

Although exemplary aspects of the present invention have been described for illustrative purposes, those skilled in the art will appreciate that various modifications, additions and substitutions are possible, without departing from essential characteristics of the invention. Thus, embodiments disclosed herein are exemplary only and not to be considered as a limitation of the invention. Accordingly, the scope of the invention is not to be limited by the above aspects but by the claims and the equivalents thereof.

What is claimed is:

1. A touch sensing apparatus comprising:
a display device including a plurality of pixels and displaying an image;
a touch screen including a plurality of touch sensors and being included in the display device;
display panel driving circuits for driving the display device;
a touch sensing circuit for applying a driving signal to the touch sensors to sense a voltage or capacitance variation in the touch sensors;
a controller for time-dividing a first frame period into a first driving period for displaying an image on the display device and a second driving period for sensing the touch sensors; and
a reset control circuit for controlling operations of the display panel driving circuits with a reset enable signal to initialize all the pixels of the display device to an equivalent reset voltage at predetermined intervals between the first driving period and the second driving period,
wherein the display panel driving circuits include a gate driving circuit,
wherein the gate driving circuit sequentially supplies a first gate pulse synchronized with a data voltage to gate lines in the first driving period and supplies a second gate pulse synchronized with the reset voltage to the gate lines on the basis of the reset enable signal,
wherein the gate driving circuit simultaneously provides the second gate pulse to all the gate lines of the display panel,
wherein the reset control circuit generates the reset enable signal and sets a reset period during which the reset voltage is applied to the pixels on the basis of the reset enable signal, and
wherein the reset period is arranged between the first driving period and the second driving period for every N (N being a natural number greater than 1) frames.

2. The touch sensing apparatus of claim 1, wherein the reset voltage is selected as a specific gradation voltage or a ground voltage.

3. The touch sensing apparatus of claim 2, wherein the specific gradation voltage includes a black gradation voltage in a specific range.

4. The touch sensing apparatus of claim 1, further comprising a backlight control circuit for compensating for a luminance decrease due to the reset period by controlling at least one of a dimming rate and a light source driving current of a backlight unit included in the display device.

5. The touch sensing apparatus of claim 1, wherein the display panel driving circuits further include a data driving circuit,
wherein the data driving circuit generates the data voltage for image display and supplies the data voltage to the data lines in the first driving period, and generates the reset voltage according to the reset enable signal and supplies the reset voltage to the data lines in the reset period for initializing the pixels.

6. The touch sensing apparatus of claim 1, wherein the second gate pulse has a pulse width greater than that of the first gate pulse.

7. The touch sensing apparatus of claim 1, wherein the data driving circuit short-circuits first output channels through which a positive data voltage is output and second output channels through which a negative data voltage is output in the reset period in order to generate the reset voltage at a black gradation level.

8. The touch sensing apparatus of claim 1, wherein the data driving circuit simultaneously controls a bias voltage of output buffers in the reset period in order to generate the reset voltage at a ground voltage level.

9. A method for driving a touch sensing apparatus comprising a display device including a plurality of pixels and displaying an image, a touch screen including a plurality of touch sensors and being included in the display device, display panel driving circuits for driving the display device, and a touch sensing circuit for applying a driving signal to the touch sensors to sense a voltage or capacitance variation in the touch sensors, the method comprising:
setting part of one frame period as a first driving period for displaying an image on the display device;
setting the remaining part of the one frame period as a second driving period for sensing the touch sensors; and initializing all the pixels of the display device to an equivalent reset voltage at predetermined intervals between the first driving period and the second driving period, wherein the initializing of the pixels of the display panel to the equivalent reset voltage comprises, sequentially supplying a first gate pulse synchronized with a data voltage to gate lines in the first driving period using a gate driving circuit included in the display panel driving circuit, and supplying a second gate pulse synchronized with the reset voltage to the gate lines on the basis of a reset enable signal, wherein the gate driving circuit simultaneously provides the second gate pulse to all the gate lines of the display panel, wherein the initializing of the pixels of the display device to the equivalent reset voltage comprises:

generating the reset enable signal; and setting a reset period during which the reset voltage is applied to the pixels on the basis of the reset enable signal, wherein the reset period is arranged between the first driving period and the second driving period and repeated at an interval of N (N being a natural number greater than 1) frames.

10. The method of claim 9, wherein the reset voltage is selected as a specific gradation voltage or a ground voltage.

11. The method of claim 10, wherein the specific gradation voltage includes a black gradation voltage in a specific range.

12. The method of claim 9, further comprising compensating for a luminance decrease due to the reset period by controlling at least one of a dimming rate and a light source driving current of a backlight unit included in the display device.

13. The method of claim 9, wherein the initializing of the pixels of the display panel to the equivalent reset voltage further comprises:

generating the data voltage for image display and supplying the data voltage to the data lines in the first driving period using a data driving circuit included in the display panel driving circuits, generating the reset voltage according to the reset enable signal and supplying the reset voltage to the data lines in the reset period for initializing the pixels initializing the pixels.

14. The method of claim 9, wherein the second gate pulse has a pulse width greater than that of the first gate pulse.

15. The method of claim 9, wherein the data driving circuit short-circuits first output channels through which a positive data voltage is output and second output channels through which a negative data voltage is output in the reset period in order to generate the reset voltage at a black gradation level.

16. The method of claim 9, wherein the data driving circuit simultaneously controls a bias voltage of output buffers in the reset period in order to generate the reset voltage at a ground voltage level.

* * * * *